July 31, 1934.  M. B. BURNS  1,968,476

FOCUSING MEANS FOR CAMERAS

Filed Oct. 25, 1933   3 Sheets-Sheet 1

Inventor
M. Bruce Burns, dec'd
by Sarah L. Burns,
Administratrix

BY
ATTORNEY.

July 31, 1934.  M. B. BURNS  1,968,476

FOCUSING MEANS FOR CAMERAS

Filed Oct. 25, 1933   3 Sheets-Sheet 2

Inventor
M. Bruce Burns, dec'd
by Sarah L. Burns
Administratrix

BY
Philip S. Hopkins
ATTORNEY.

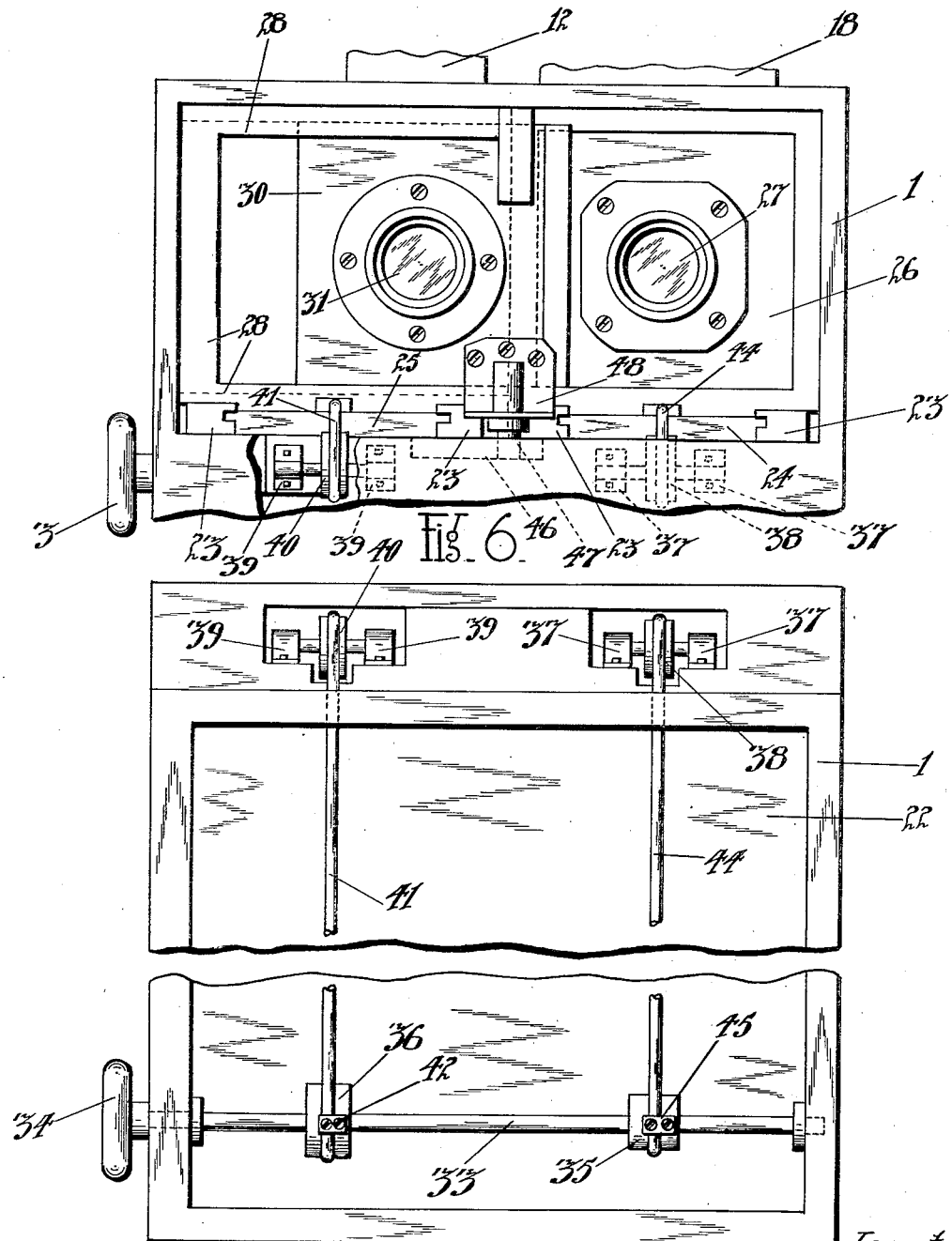

Patented July 31, 1934

1,968,476

UNITED STATES PATENT OFFICE 1,968,476

FOCUSING MEANS FOR CAMERAS

Milfred Bruce Burns, deceased, late of Lewiston, Idaho, by Sarah L. Burns, administratrix, Lewiston, Idaho, assignor of one-half to Peter Tettelbach, Rochester, N. Y.

Application October 25, 1933, Serial No. 695,152

2 Claims. (Cl. 95—44)

This invention relates to a focusing means for cameras and is directed particularly to a double lens camera in which one lens is used for making the exposures and the other for focusing.

The principal object of this invention lies in the provision of means whereby two adjacently mounted lenses on a camera may be simultaneously adjusted longitudinally of their axes for focusing, there being also provided a simultaneous lateral adjustment of one of the lenses toward and away from the other during such focusing movement whereby to vary the position of the image on the focusing screen in accordance with the distance the object is from the camera.

Still another object lies in the provision of an adjusting means for the lenses by means of which the relative movement of the lenses can be made in exact accordance with the difference in focal lengths thereof.

A further object lies in the provision of a "focusing" lens having a longer focus than the "taking" lens, whereby greater accuracy of focus is assured.

Other objects and advantages in details of construction will be apparent as the description proceeds, reference now being had to the figures of the accompanying drawings forming a part of this application and wherein like reference numerals indicate like parts.

In the drawings:

Figure 6 is a detail front view illustrating the lenses in the position of adjustment opposite that shown in Figure 3, certain parts being broken away for clearness.

Figure 7 is a bottom plan view of the camera showing the means for adjusting the lenses longitudinally.

Figure 1:
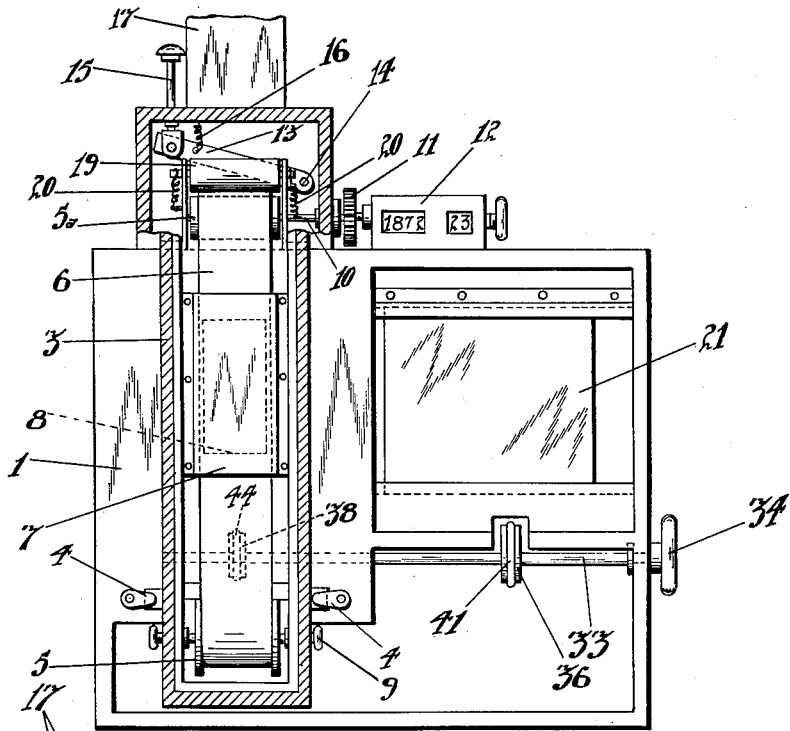
Figure 1 is a rear view of a camera embodying my invention, certain parts being shown in section for clearness of illustration.

This invention constitutes an improvement of the invention set forth in Patent No. 1,931,890 issued October 24, 1933, to Sarah L. Burns, administratrix of the estate of Milfred Bruce Burns, deceased, for Photographic camera.

The reference character 1 refers generally to the camera body which may be of any desired shape or size and which may be supported upon any suitable tripod or other camera support 2.

Suitably secured to the back of the camera adjacent one side thereof is a film housing or magazine 3 which may be removably secured in the casing 1 as by the fastening device 4 or the like. This magazine is adapted to receive at its upper and lower ends the roll film spools 5, from the upper one of which the film 6 is adapted to be moved over an idler roller 5a and then downwardly through the housing between a backing or guide plate 7 and an opening 8 provided in the camera and which opening defines the focal plane of the camera. Any suitable means such as the knob 9 may be provided for rotating the roller or takeup spool 5 whereby the film may be drawn downwardly after each exposure and wound upon the takeup spool.

The idler roller 5a may be provided with an extending shaft 10 upon which is a gear 11 actuated through suitable gears 11a from the supply spool shaft. A counter 12 is provided and driven by this gearing whereby the number of exposures or lengths of film corresponding thereto may be indicated to the operator.

Figure 2:
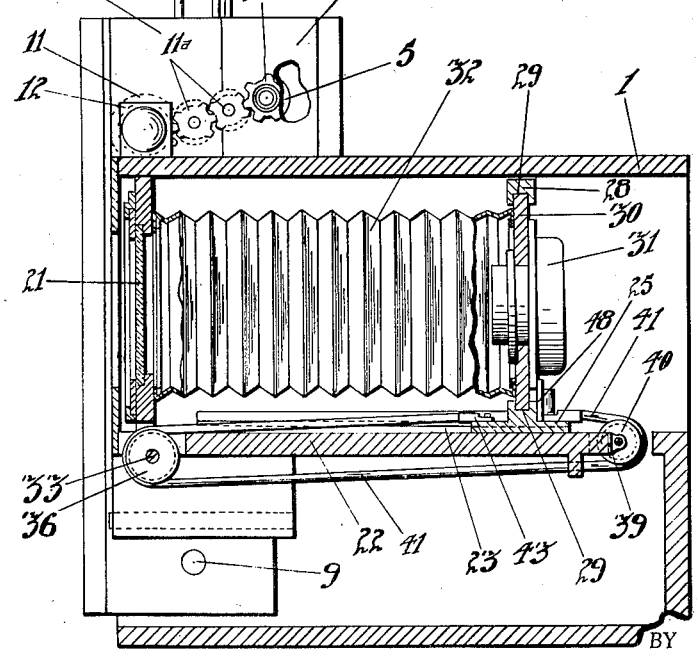
Figure 2 is a side sectional view illustrating one of the lenses and the longitudinal adjusting means therefor.
Figure 3:
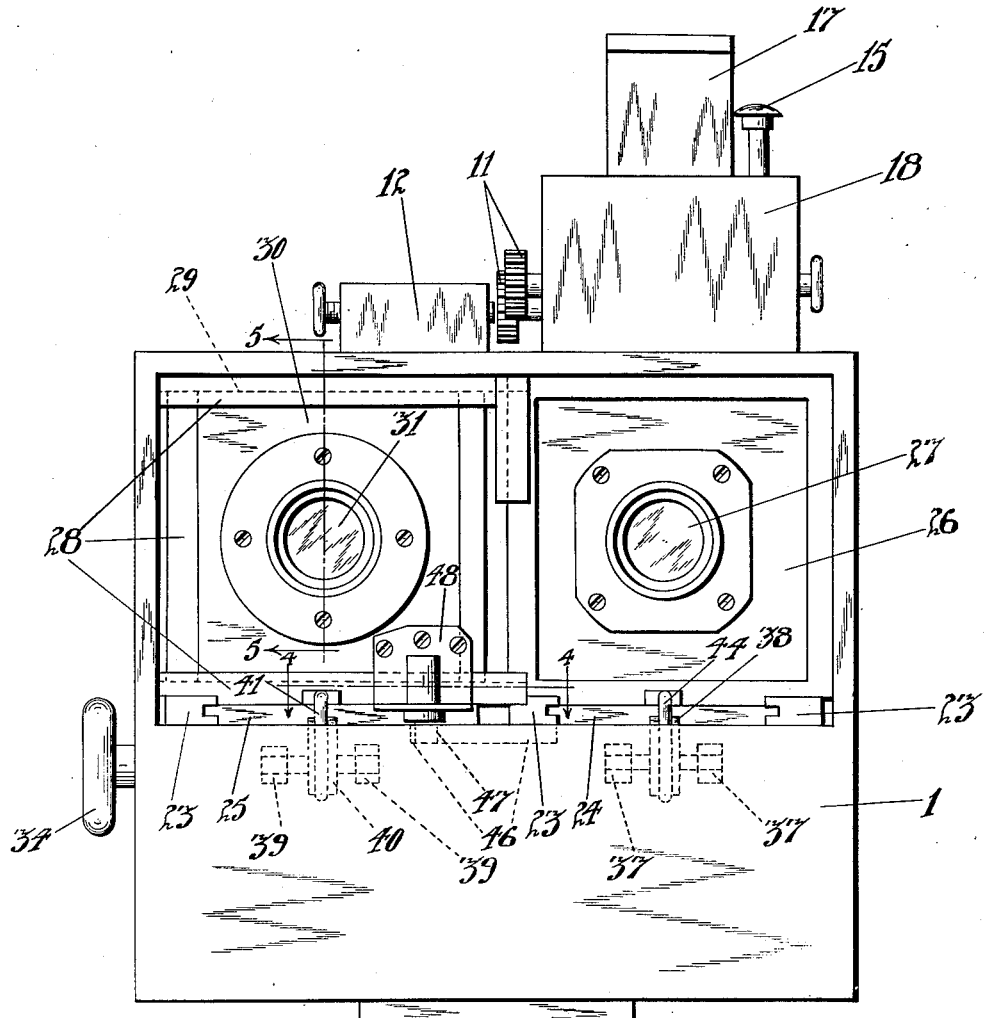
Figure 3 is a front view of the camera illustrating the lenses in one position of adjustment.
Figure 4:
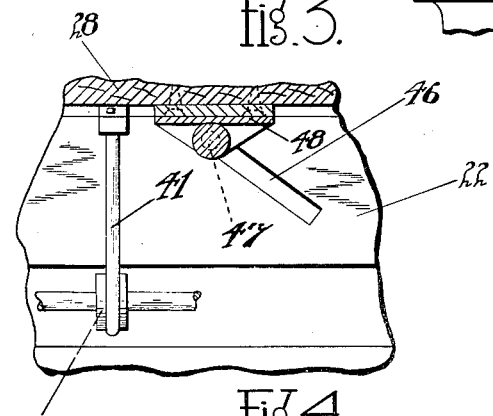
Figure 4 is a detail sectional view taken on the line 4—4 of Figure 3 and showing the means for guiding the movement of one of the lenses laterally with respect to the other.

It will be noted with reference to Figure 2 that the upper or supply spool 5 is disposed in a forwardly positioned section 18 of the casing 3 and that a cutting knife 13 is provided, pivoted as at 14 and adapted to be actuated by finger piece 15 whereby the film 6 may be severed adjacent its upper end. This affords a convenience for removing the exposed sections of the film at any time it may be desired to do so. A coil spring 16 normally holds the cutting knife up out of cutting position. Dark slides 17 are provided adjacent the cutting knife and between the same and the supply spool 5 whereby the magazine casing 3 may be removed from the camera casing 1 after the film has been cut and the remaining unexposed film on the spool 5 within the fixed section 18 is thus protected from exposure to light.

A tension roller 19 is suitably mounted within the magazine 1 and is normally held in engagement with the film 6 by means of the springs 20.

The parts just described are ancillary to the invention to be claimed herein and have, therefore, not been shown nor will they be described in any greater detail.

Fixedly mounted in the camera casing 1 and in the same plane with the focal plane opening 8 is a focusing screen 21 such as ground glass or the like.

Mounted within the camera casing 1 is a horizontally disposed platform support 22 on the upper surface of which are provided two sets of guides or trackways 23 in parallel relation. Suitably mounted in each of the trackways are the lens board supports 24 and 25.

One of the trackways is in alignment with the film 6 and the other in alignment with the focusing screen 21. The lens board support 24 in alignment with the film 6 has suitably secured thereto the lens board 26 upon which is suitably mounted the lens 27 by means of which the film is exposed. Obviously therefore, as the support 24 moves in its trackway 23 the lens 27 will be moved therewith toward or away from the film and the object being photographed and in direct alignment therewith.

Figure 5:
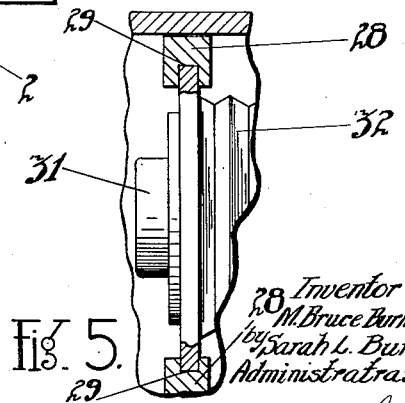
Figure 5 is a detail sectional view taken on the line 5—5 of Figure 3 illustrating the adjustable mounting of one of the lenses.

Mounted upon the slidable support 25 is a lens board frame 28, the upper and lower portions of which are grooved as at 29 (see Figure 5), and slidably mounted in such grooves is the lens board 30 upon which is suitably mounted the lens 31. Obviously therefore, the lens 31, which is disposed in alignment with the focusing screen 21 is movable toward and away from such screen when the support 25 is moved in the tracks 23. Also the lens 31 is movable laterally with respect to the lens 27 by means of the lens board 30 being slidably mounted in the grooves 29 in the frame 28. For the purpose of convenience of description, the lens 27 will be described as the photographing lens and the lens 31 as the "focusing" or finder lens.

The space between the lens 27 and the film 6 and the space between the lens 31 and the focusing screen 21 is enclosed in each case by flexible bellows such as that shown at 32 in Figure 2.

Means is provided for simultaneously moving the lenses 27 and 31 longitudinally of their axes for the purpose of focusing on an object to be photographed. This means comprises a shaft 33, extending laterally through the camera and provided on an exteriorly projecting end with a hand wheel 34 by means of which the shaft may be rotated. Mounted upon the shaft 33 in substantial alignment with the lens 27 is a winding drum or pulley 35 rotatable with the shaft. Also fixed on the shaft 33 in substantial alignment with the lens 31 is a second winding drum or pulley 36.

Rotatably mounted in suitable brackets 37 adjacent the front end of the platform 22 is a roller 38 in alignment with the drum 35. Similarly, rotatably supported in brackets 39 is a roller 40 in alignment with the winding drum 36.

It will be noted with reference to Figure 2 that a cable 41 is suitably secured at one end to the slidable support 25 and passing around the roller 40 and rearwardly underneath the platform 22, around the drum 36, to which it is secured by any suitable fastening means such as the clamp 42 and then forwardly over the platform 22 and secured at its opposite end as at 43 to the rear side of the slidable support 25.

Similarly a cable 44 is secured at one end to the front edge of the slidable support 24 and passes around the roller 38 and rearwardly under the platform 22, around the winding drum 35 to which it is secured as by the clamp 45 and then over the platform 22 with its opposite end secured to the rear edge of the slidable support 24 in the same manner as shown and described for the cable 41. It will be apparent, therefore, that when the shaft 33 is turned by the hand wheel 44 the slidable supports 24 and 25 carrying the lenses 27 and 31 respectively will be simultaneously moved longitudinally of their axes in a direction depending upon the direction of rotation of the shaft 33. Thus the longitudinal adjustment of the lenses simultaneously for focusing upon an object is accomplished. It will be understood that if the lenses 27 and 31 are of the same focal length, this movement thereof should be the same amount for each lens. If, however, the lenses are of different focal lengths, then naturally one lens must move a relatively different amount than the other in order to compensate for such difference in focal length. This is readily provided for by making the winding drums 35 and 36 of different diameters to correspond to the different amounts of movement necessary for the two lenses. This is shown clearly in Figure 7 wherein the winding drum 35 is of a smaller diameter than the winding drum 36, and constitutes an important feature of this invention in that the "focusing" lens 31 is of a longer focus than the photographing lens 27. By this novel arrangement the benefit of a very fine and accurate focus on the focusing screen with the relatively long focus lens is obtained, and that accuracy of focus, is, of course, translated to the short focus "taking" lens by the computed diameters of the lens moving drums.

The exact amount of difference in the diameters of these drums is, of course, a matter of mathematical calculation to provide for the desired compensation.

The movement of the lenses above described provides not only for the simultaneous adjustment of the lenses but for that adjustment in parallel relation due to the parallel positioning of the trackways 23 and the supports 24 and 25 slidable therein. As is well known, however, the distance of an object to be photographed from the camera may vary considerably and while the focus of the lenses for such distances is provided for in the adjusting means just described, it will be clear that when an object is nearby the camera, and in direct alignment with the lens 27, the angle at which the image of such object is recorded on the focusing screen is greater than when such object is a greater distance from the camera. This means, of course, that with the lenses a given distance apart and with the film and ground glass the same distance apart, if an object located at a distance of 100 feet from the camera appears as an image on the focusing screen 21 centrally thereof, the same image of this object would appear at one side or the other of the center of the focusing screen if the distance between the object and the camera is changed.

In order to provide for the image of the object being focused upon always appearing centrally of the focusing screen, there is provided a means whereby the lateral position of the focusing lens 31 with respect to the lens 27, may be adjusted simultaneously with the focusing adjustment an amount necessary to compensate accurately for the varying distances at which the object is focused upon.

This means includes an angularly disposed groove or slot 46 provided in the platform or supporting plate 22, such slot receiving a downwardly extending pin or roller 47 fixedly carried by a bracket 48 mounted upon the lens board 30.

This lens board 30 being laterally adjustable in the frame 28 by means of the grooves 29 therein is thus caused to move laterally as the entire lens supporting unit is moved longitudinally in the trackways 23, by virtue of the member 47 riding in the slot 46, the angle of the slot, of course, determining the amount of such movement. This angle is likewise determined mathematically in order to accurately compensate for the position of the image on the focusing screen as determined by the different distances from the camera at which said object is focused.

From the foregoing it will be clear that in the use of the camera, the operator first arranges the film for exposure and then sights the camera upon the object to be photographed with the photographing lens 27 in direct alignment therewith. He then rotates the shaft 33 by means of the hand wheel 34 which simultaneously moves both lenses longitudinally of their axes to bring the object into sharp focus on the focusing screen 21 and of course, simultaneously on the film in the focal plane. During this focusing adjustment, the focusing lens 31 moves laterally toward or away from the lens 27, depending upon the focusing position thereof to keep the image of the object centrally positioned on the focusing screen 21.

A shutter of any suitable type is, of course, provided for the photographing lens 27 and by means of which the exposure is made. After the exposure has been made the operator winds the film downwardly upon the takeup spool 5 by means of the finger piece 9 and the camera is then ready for the next exposure.

It will thus be seen that there is provided a focusing means for cameras having both a photographing and a focusing lens by which not only improved accuracy of focus is made possible but by which the image of the object being photographed is always maintained in central position on the focusing screen regardless of its distance from the object.

Many changes may be made in details of construction and arrangement of parts without departing from the spirit and scope of the invention. The invention is not limited, therefore, to the exact form herein shown and described other than by the appended claims.

What is claimed is:

1. In combination, a camera, a photographing lens and a finder lens, said finder lens being of longer focus than said photographing lens, and means for causing simultaneously axial movement of said lenses for focusing, said movement being enough greater for said finder lens than for said photographing lens to compensate for the difference in focal lengths of said lenses, and means for causing lateral movement of said finder lens only, simultaneously with the axial movement thereof.

2. In combination, a camera, a photographing lens and a finder lens, said finder lens being of longer focus than said photographing lens, means for causing simultaneously axial movement of said lenses for focusing, said movement being enough greater for said finder lens than for said photographing lens to compensate for the difference in focal lengths of said lenses, and means for causing lateral movement of said finder lens only, simultaneously with the axial movement thereof, said means comprising a fixed member on said finder lens engaging in an angular slot provided in said camera.

SARAH L. BURNS,
*Administratrix of the Estate of Milfred Bruce Burns, Deceased.*